PROPORTIONAL CLOCK AND CONTROL CIRCUIT FOR CONVERTERS

Filed March 21, 1962 2 Sheets-Sheet 1

INVENTOR.
DONALD W. FULLER
BY
Samuel B. Stone
ATTORNEY

April 5, 1966 D. W. FULLER 3,245,072
PROPORTIONAL CLOCK AND CONTROL CIRCUIT FOR CONVERTERS
Filed March 21, 1962 2 Sheets-Sheet 2

INVENTOR.
DONALD W. FULLER
BY
Samuel B. Stone
ATTORNEY

United States Patent Office 3,245,072

Patented Apr. 5, 1966

3,245,072

PROPORTIONAL CLOCK AND CONTROL CIRCUIT FOR CONVERTERS

Donald W. Fuller, Pacific Palisades, Calif., assignor to Beckman Instruments, Inc., a corporation of California Filed Mar. 21, 1962, Ser. No. 181,326
6 Claims. (Cl. 340—347)

Figure 1:
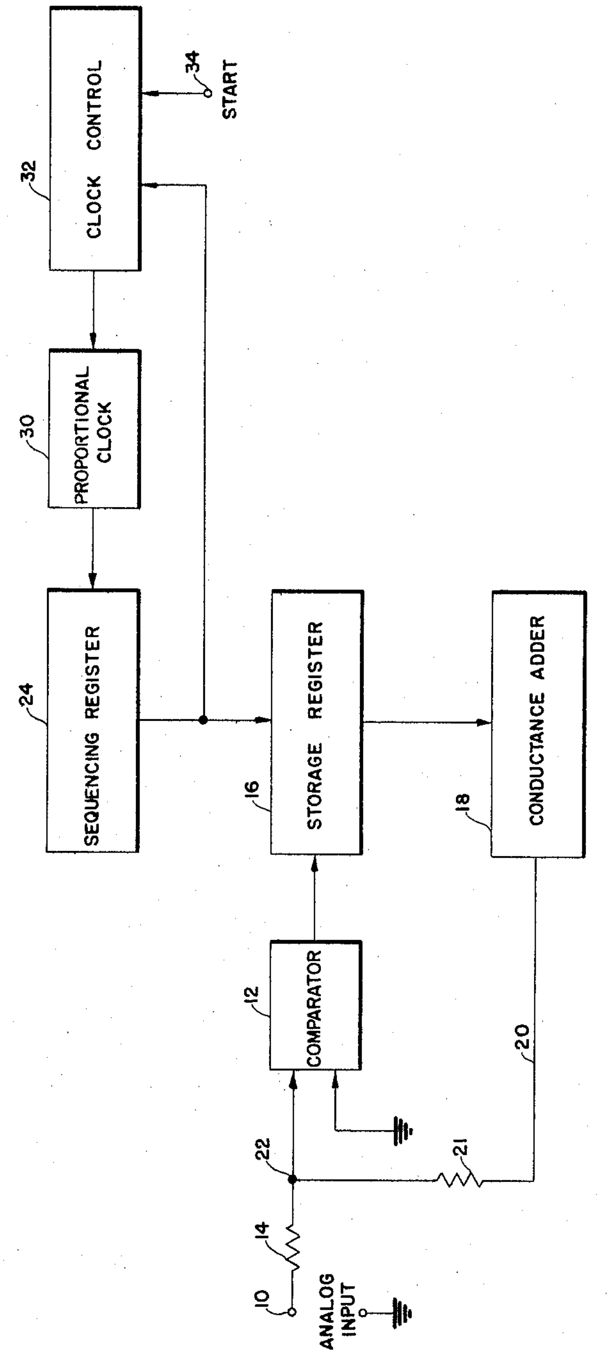

This invention relates to converters and more particularly to a proportional clock arrangement for analog-to-digital converters and digital-to-analog converters.

Analog-to-digital and digital-to-analog converters of the successive approximation type are well-known in the art. In an ADC of this type, for example, each bit indicative of an analog value is determined in sequence, beginning with the bit of greatest significance. A storage register is utilized to store indications of these bits which provide a digital number indicative of the input analog signal. Initially, this storage register is set so that the most significant bit is a one, and a decoded analog signal is derived corresponding to this setting and compared with the input analog signal. If the input analog signal is larger than the decoded analog signal, the first bit remains unchanged. If the decoded analog signal is the larger, the first bit is returned to zero. The second most significant bit is then made a one and a decoded analog signal is derived. This analog signal is added to the first, if any, and the sum is compared with the input analog signal. If the input analog signal is larger than this sum signal, the second bit remains unchanged. If the sum is larger, the second bit is returned to zero. In a like manner, the remaining bits of the digital number characteristic of the input analog signal are determined.

In converters of the type discussed above, a clock operating at a fixed frequency is utilized to control the bit sampling. This clock, which may take the form of an oscillator or the like, may control a shift register which in turn controls the sequencing of the storage register, or the clock pulses may be counted by a counting circuit and gated through a matrix to control the sequencing of the storage register. The frequency of the clock, and therefore the frequency of sampling, is determined by the time required for each bit decision to be made. The periods of time for making the most significant bit decisions are the greatest since larger signals are involved when making the higher, or more significant, bit decisions and the components of the converter require longer settling times. Accordingly, the frequency of sampling for all bit decisions is constant and is based on the time involved in sampling the more significant bit or bits.

According to a feature of the present invention a converter is provided which operates at greater speeds than prior converters.

According to another feature of the present invention, the total sampling time for a converter is increased by causing individual sampling times for certain bits to be proportional to the individual bit weight.

A further object of the present invention is in the provision of a converter in which one or more bit decisions are made at a slower rate than one or more other bit decisions to allow an increased settling time or times for the components of the converter.

Another object of this invention is to provide a converter which utilizes a longer sampling time for the largest bit weight sample, and which subsequently allows a progressive reduction in the sampling times for each successive bit weight sample.

It is a further object of the present invention to provide a converter in which the highest order decade is sampled at a slower rate than the lower order decades, or in which the sampling times for the lower order decades are progressively decreased for each successive decade.

According to the present invention, the sequencing register for an analog-to-digital converter or a digital-to-analog converter is controlled from a proportional clock arrangement so that longer sampling times are allowed for one or more of the significant bit decisions and shorter sampling times are allowed for the less significant bit decisions. The clock device provides output signals with progressively shorter delays between each signal in order to provide longer sampling times for the more significant decisions and progressively shorter sampling times for the less significant decisions. The clock device is controlled from the sequencing register so that each sampling time is proportional to the bit weight of the particular decision. The clock device also may operate to provide a given sampling time for one or more of the highest decisions and a shorter but constant sampling time for each of the remaining decisions.

In an illustrative embodiment of the concepts of the present invention, a latch-type oscillator provides the clock pulses for the sequencing register. The sequencing register supplies its sequencing signals to bistable devices, such as flip flops, in a storage register, and to a clock control circuit. The clock control circuit includes a plurality of weighted impedances at least some of which are sequenced along with certain of the bistable devices in the storage register to control the proportional clock circuit. As the bistable devices in the storage register are sequenced, the clock control supplies to the proportional clock certain signals which change from one value to another and the proportional clock in turn provides certain output pulses at a faster rate. The signals applied to the proportional clock from the clock control may progressively change from one value to another causing the proportional clock in turn to provide output pulses having a progressively faster rate, i.e., output pulses having a progressively shorter delay therebetween.

Figure 2:
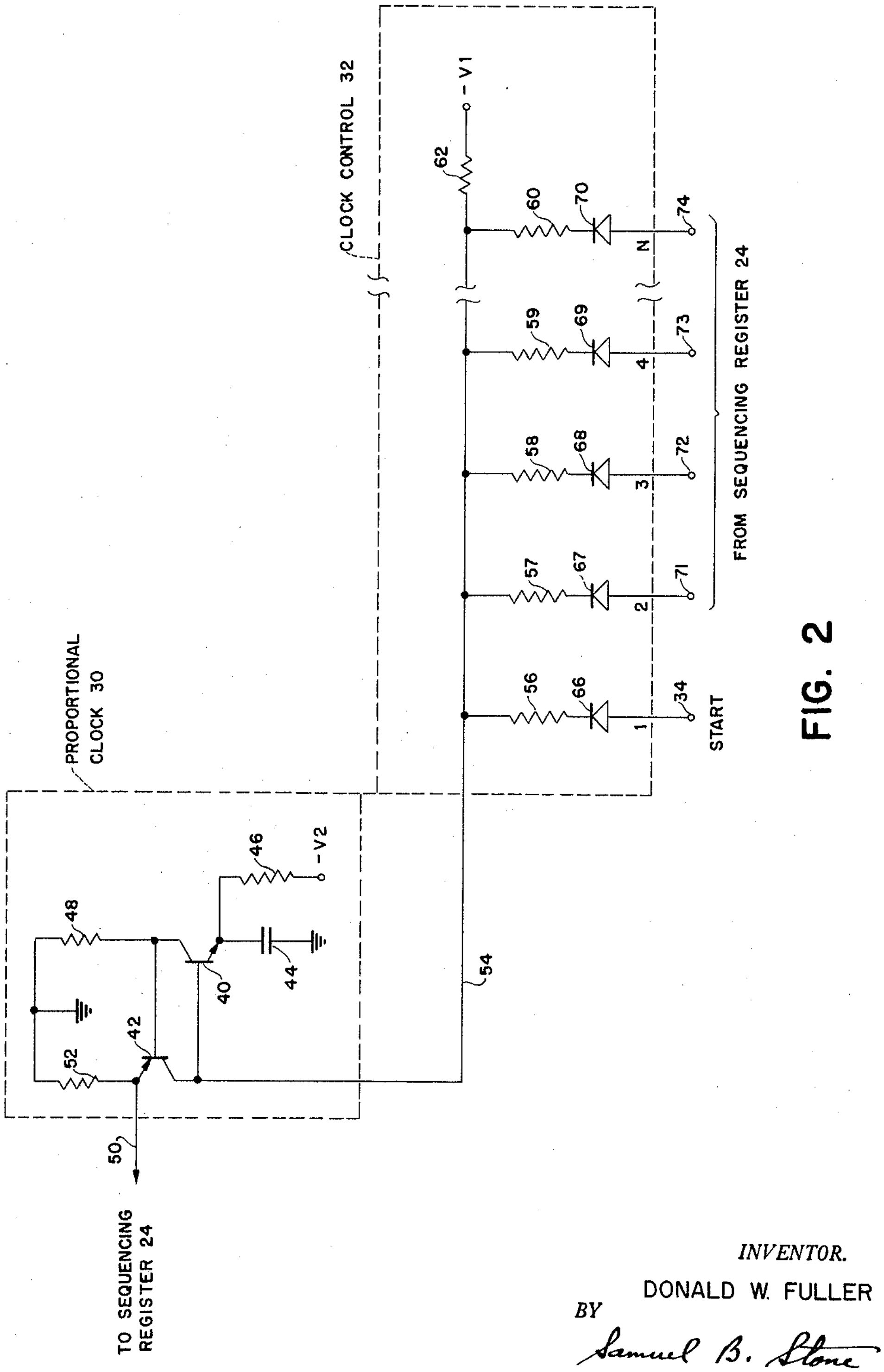

Other features and objects of the invention will be better understood from a consideration of the following detailed description when read in conjunction with the attached drawings in which:

FIG. 1 is a block diagram of an analog-to-digital converter employing the principles of the present invention; and FIG. 2 is a schematic diagram of a suitable proportional clock and clock control for use in the arrangement shown in FIG. 1.

In high-accuracy analog-to-digital converters or digital-to-analog converters the settling times for the components during each bit decision form the major time delays of the over-all system. The settling times are caused by the resistances and capacitances of the elements of the system, and also the time constants of the components, such as amplifiers, of the system which have step inputs. For example, the comparator which may include one or more amplifiers receives input signals which are made progressively smaller as the sampling progresses. Hence, the larger bit weight decisions require longer settling times than do the lesser significant decisions.

Assume, for example, a 10,000 digit binary-coded-decimal converter having four 8–4–2–1 decades wherein the first decision has a value of 8,000. To allow this first decision to settle to one digit (one digit out of 8,000 or approximately .01%), 9.2 times the system and amplifier time constants must elapse. A decision of 800 in the second decade which is allowed to settle to one digit (approximately .1%) requires 6.9 times the system and amplifier time constants. A decision of 80 which is allowed to settle to one digit (approximately 1%) requires 4.6 times the system and amplifier time constants. A decision of 8 which is allowed to settle to one digit (approximately 10%) requires 2.3 times the system and amplifier time constants to elapse. Therefore, it can be seen that successive decades require shorter settling times. Furthermore, it will be understood that progressively shorter settling times are required for each bit decision, i.e., 8,000, 4,000, 2,000, 1,000, 800, 400, etc. It will be apparent to those skilled in the art that the above analysis is equally applicable to each bit decision or to each group of bit decisions in any coding arrangement.

Referring to FIG. 1, a block diagram for an analog-to-digital converter is illustrated. An analog input signal is applied to an input terminal 10 which is coupled to the input of a comparator 12 through a summing resistance 14. The output of the comparator is connected to the bistable devices, such as flip flops, in a storage register 16. The outputs from the bistable devices in the storage register 16 are connected to operate a conductance adder 18. The output of the conductance adder 18 is applied through a line 20 and a summing resistance 21 to a summing point 22 at the input of the comparator 12. A sequencing register 24 controls the sequencing of the bistable devices in the storage register 16. The sequencing register may include a shift register, a ring counter, or the like, or it may include a counting circuit and a decoding matrix.

The analog signals from the comparator 12 are applied to each of the bistable devices in the storage register 16 which provides a parallel output. There is a bistable device for each binary digit of the parallel output data. The conductance adder 18 functions as a digital-to-analog converter and comprises a plurality of precision resistances and a plurality of switches. The switches serve to connect the resistances to one of two terminals of a reference potential source. The components of FIG. 1 thus far described are well known in the prior art, one example of which is shown in FIG. 1 of copending U.S. Patent application of Paul R. Gilson, Serial No. 139,132, now Patent No. 3,139,614, entitled "Serial-to-Parallel Converter," filed September 19, 1961, and assigned to the assignee of the present invention.

An analog input signal is applied to the input terminal 10 and the sequencing register 24 sets the highest order bistable device in the storage register 16. When this bistable device is set, the highest order resistance (having the highest conductance) in the conductance adder 18 is switched from one potential to another, and the conductance adder 18 supplies to the summing point 22 an analog output corresponding to the conductance of the switched resistance. This analog output from the conductance adder 18 subtracts from the analog input signal applied to the terminal 10. If the output signal from the conductance adder is less than the input analog signal, the highest order bistable device in the storage register 16 remains set and the sequencing register 24 sets the next lower order bistable device. If the output from the conductance adder 18 is greater than the analog input signal, the highest order bistable device in the storage register 16 is reset and the sequencing register 24 sets the next lower order bistable device. The discussion so far is typical of analog-to-digital converters of the successive approximation type. As noted previously concerning prior converters, the sequencing register 24 normally is controlled from a clock having a fixed frequency.

According to a feature of the present invention, a proportional clock 30 is controlled from a clock control circuit 32. The proportional clock 30 controls the sequencing of the sequencing register 24. The sequential outputs from the sequencing register 24 are applied to operate the clock control circuit 32. A start input terminal 34 is connected to the clock control circuit 32. A start signal is applied to the clock control circuit 32 through the start terminal 34. The clock control circuit 32 in turn provides a signal to the proportional clock 30 which operates at a given frequency for any particular input from the clock control circuit 32. However, the clock control circuit 32 provides different signals to the proportional clock 30 as the sampling progresses. The signal from the clock control circuit 32 to the proportional clock 30 may change for one or more bit decisions, or it may change only for one or more decades in a binary-coded-decimal ADC.

The first output pulse from the proportional clock controls the sequencing register 24 to provide a first output which sets the highest order bistable device in the storage register 16. This first output from the sequencing register 24 may be applied to the clock control 32 which in turn provides an output to increase the frequency of operation of the proportional clock 30. After a predetermined delay, the proportional clock 30 provides a second output pulse which causes the sequencing register 24 to provide a second output which in turn sets the second, or next lower, bistable device in the storage register 16. This second output from the sequencing register 24 operates the clock control circuit 32 to provide an output signal to further increase the frequency of operation of the proportional clock 30. This operation continues until all bit decisions have been made, with the sequencing progressing at a faster rate as the lower order bit decisions are being made.

In the event that a binary-coded-decimal code is used, it may be desirable to increase the sampling rate only for each decade instead of for each individual bit decision. In such a case, the storage register 16 includes a plurality of bistable devices conventionally arranged as decades. After the sequencing is started, the clock control circuit 32 receives a signal from the sequencing register 24 only when the last bistable device of a decade in the storage register 16 is set. For example, if each decade includes four bistable devices, every fourth output line from the sequencing register 24 is connected to the clock control circuit 32. In this manner, each bistable device of the highest order decade in the storage register 16 is sequenced at a given rate, each bistable device in the next lower order decade is sequenced at a higher rate, and so forth. If desired, only one or more of the highest order bistable devices or decades may be sequenced at a slow rate with the remaining devices or decades being sequenced at a faster constant rate.

FIG. 2 illustrates an exemplary circuit arrangement which is suitable for use as the proportional clock 30 and the clock control circuit 32 illustrated in block diagram form in FIG. 1. The proportional clock 30 is a latch-type oscillator including an NPN transistor 40 and a PNP transistor 42. The emitter of the transistor 40 is connected through a capacitance 44 to ground, and through a resistance 46 to a negative potential source. The collector of the transistor 40 is connected to the base of the transistor 42, and through a resistance 48 to ground. The emitter of the transistor 42 is connected through a line 50 to the sequencing register 24 and through a resistance 52 to ground. The collector of the transistor 42 is connected to the base of the transistor 40. The output of the clock control circuit 32 is connected through a line 54 to the junction of the collector of the transistor 42 and the base of the transistor 40. The clock control circuit 32 includes a plurality of resistances 56 through 60. One terminal of each of the resistances 56 through 60 is connected to the output line 54. A negative potential source is connected through a resistance 62 to the output line 54. A plurality of diodes 66 through 70 are connected to the remaining terminals of the respective resistances 56 through 60. The start terminal 34 is connected to the diode 66. The diodes 66 through 70 serve as switches for the resistances 56 through 60. Switching devices other than diodes, such as transistor switches, may be used if desired. Terminals 71 through 74 are connected to the respective diodes 67 through 70. The terminals 71 through 74 are connected from the outputs of the sequencing register 24, the terminal 71 being connected from the output which controls the highest order or most significant bistable device in the storage register 16. This assumes, of course, an arrangement for increasing the sampling time for each decision. Should an increase in sampling time be desired only for each decade, the input terminal 71 would be connected to the output of the sequencing register corresponding to the last bit in the first decade.

In the operation of the proportional clock 30 in FIG. 2, the period of oscillation is determined by the values of the capacitance 44 and the resistance 46, the voltage at which the transistor 40 begins to conduct, and the amount of charge delivered to the capacitance 44 while the transistors 40 and 42 are on. The latter two conditions depend upon the voltage at the collector of the transistor 42, and this voltage is varied by diode switching in the clock control circuit 32. Hence, it should be apparent that the number of diodes 66 through 70 that are required is limited only by the number of variations in sampling speed desired. The values of the resistances 56 through 60 are chosen to provide the required voltages on the line 54 to cause the proportional clock 30 to provide output pulses having the desired repetition frequencies. The resistance 62 in combination with one of the resistances 56 through 60 serve as a voltage divider to supply the desired voltage on the output line 54. The particular values of the resistances 56 through 60 and 62 are chosen based on the time constants of the system for the particular decisions involved. As an example in a four decade ADC in which each decade is to be sampled at a different rate, the resistances 56 and 62 may be approximately equal with the value of the resistance 57 approximately one half that of the resistance 56, the value of the resistance 58 approximately one half of the value of the resistance 57 and the value of the resistance 59 approximately one half that of the resistance 58. With only four decades the resistance 60 and the diode 70 are not required. It should be noted that if each sampling time is to be made proportional to each bit weight, the number of the resistances 56 through 60 is the same as the number of bits, whereas, if the sampling time is constant for each bit of a decade and proportional to the decade weight, the number of the resistances corresponds to the number of decades. Hence, although five resistances 56 through 60 are shown, more or less may be employed as desired.

With the arrangement shown in FIG. 2, the line 54 is made progressively less negative as the resistances 56 through 60 are switched. As the line 54 is made less negative, the period between output pulses on the line 50 is made shorter thereby increasing the sampling time. As noted previously, the voltage at which the transistor 40 begins to conduct and the amount of charge delivered to the capacitor 44 depend on the potential supplied by the line 54. As the capacitor 44 charges toward the potential of the line 54, the transistor 40 turns off. This action turns off the transistor 42. The capacitor then discharges through the resistance 46 and the transistor 40 turns on. The transistor 42 turns on and holds the transistor 40 on. Again the capacitor 44 charges thereby turning off the transistor 40. This operation continues and, therefore, output pulses are provided on the output line 50 as the transistor 42 turns on and off. As the potential on the line is made less negative the output pulses on the line 50 occur closer together. With the circuit shown, the pulse width of the output pulse on the line 50 also will vary slightly with variations in the delay between the pulses. If desired, a pulse shaping network may be included between the proportional clock 30 and the sequencing register 24 to provide pulses to the sequencing register 24 having a substantially constant width. Such circuits are well known to those skilled in the art.

It now should be apparent that the present invention provides an arrangement whereby the sampling time in converters may be proportional to the bit weight or proportional to the significance of the decade. Also, proportional sampling may be provided only for certain bit or decade decisions, such as, only the highest order or the few highest order decisions if desired. Although an exemplary embodiment of the invention has been disclosed and discussed, it will be understood that other applications and circuit arrangements are possible and that the embodiment disclosed may be subjected to various changes, modifications and substitutions without necessarily departing from the spirit of the invention.

What is claimed is:

1. A converter including a storage register, a digital-to-analog converter, a sequencing register, and a comparator, means connecting the sequencing register to sequence the storage register, means connecting the storage register to control the digital-to-analog converter, means connecting the digital-to-analog converter to the comparator, and means connecting the comparator to the storage register, the improvement comprising a clock control circuit including a plurality of impedances and a plurality of switching devices, means connecting said switching devices to certain of said plurality of impedances, means connecting said sequencing register to said switching devices for operating said switching devices, a proportional clock including a semiconductor oscillatory circuit, means connecting one terminal of each of said impedances to said proportional clock to cause said proportional clock to operate at different frequencies, and means connecting the proportional clock to said sequencing register to control the sequencing thereof.

2. A converter as in claim 1 wherein said storage register includes a plurality of bistable devices having different degrees of significance, and said proportional clock provides output pulses at different rates to sequence at least certain of said bistable devices at different rates.

3. A converter including a digital-to-analog converter having a plurality of stages, a first means having a plurality of stages and connected to operate the stages of said digital-to-analog converter, and second means for providing sequential output signals and connected to operate the stages of said first means, the improvement comprising a clock control means including a plurality of stages each of which includes an impedance and a switch connected thereto, a proportional clock means connected to control the sequential output signals of said second means, one terminal of each of said impedances being connected together and to said proportional clock means to control the operation thereof, third means for applying at least certain of the sequential output signals from said second means to control said switches whereby said clock control means applies certain different signals to said proportional clock means when said second means is providing sequential output signals and said proportional clock means produces output signals having at least one increase in repetition frequency thereby to cause said second means to have at least one increase in the repetition frequency of said sequential output signals.

4. A converter as defined in claim 3 wherein the number of said impedances and said switches is equal to the number of stages in said first means, and said sequential output signals from said second means occur at progressively faster rates.

5. A converter as in claim 3 wherein the number of said impedances and said switches is a submultiple of the number of said stages in said first means, and said sequential output signals from said second means occur at progressively faster rates with the occurrence of a number of said sequential output signals equal to said submultiple.

6. A successive approximation converter including a storage register and means for sequencing the register, and a digital-to-analog converter, means connecting the storage register to control the digital-to-analog converter, the improvement comprising a clock control means including a plurality of impedances which are switched under control of said sequencing register to provide output voltages, a proportional clock means including a semiconductor oscillatory circuit connected to said clock control means for receiving voltages therefrom and for producing output signals having different repetition rates, and means applying said output signals from said proportional clock means to control said sequencing register.

References Cited by the Examiner

UNITED STATES PATENTS

| | | | |
|---|---|---|---|
| 2,970,309 | 1/1961 | Towles | 340—347 |
| 3,105,231 | 9/1963 | Gordon et al. | 340—347 |
| 3,124,794 | 3/1964 | Patmore | 340—347 |
| 3,182,303 | 5/1965 | Howe | 340—347 |

MALCOLM A. MORRISON, *Primary Examiner.*